United States Patent [19]

Modic

[11] E Patent Number: Re. 33,289

[45] Reissued Date of Patent: Aug. 7, 1990

[54] TRANSPARENT MEMBRANE STRUCTURES

[75] Inventor: Frank J. Modic, Scotia, N.Y.

[73] Assignee: General Electric Company, Waterford, N.Y.

[21] Appl. No.: 367,127

[22] Filed: Aug. 4, 1986

Related U.S. Patent Documents

Reissue of:

[64] Patent No.: 4,472,470
Issued: Sep. 18, 1984
Appl. No.: 511,705
Filed: Jul. 7, 1983

[51] Int. Cl.[5] ..... B32B 5/02

[52] U.S. Cl. ..... 428/145; 427/387; 427/407.3; 427/412; 428/141; 428/143; 428/240; 428/241; 428/244; 428/248; 428/251; 428/252; 428/253; 428/266; 428/273; 428/283; 428/285; 428/290; 428/333; 428/447; 428/448

[58] Field of Search ..... 428/141, 143, 145, 240, 428/241, 242, 244, 248, 251, 252, 253, 266, 273, 283, 285, 290, 333, 447, 448; 427/387, 407.3, 412

[56] References Cited

U.S. PATENT DOCUMENTS

| | | | |
|---|---|---|---|
| 3,284,406 | 11/1966 | Nelson | 260/46.5 |
| 3,436,366 | 4/1969 | Modic | 260/37 |
| 3,457,214 | 7/1969 | Modic | 260/37 |
| 3,527,655 | 9/1970 | Ballard | 117/72 |
| 3,639,155 | 2/1972 | Harlein et al. | 117/138.8 |
| 4,297,265 | 10/1981 | Olsen | 260/33.6 SB |
| 4,300,532 | 11/1981 | Olsen | 126/417 |
| 4,358,558 | 11/1982 | Shimizu | 524/847 |

OTHER PUBLICATIONS

"Fabric Structures Taking Shape", Industrial Fabric Products Review, Nov. 1982, p. 28.

*Primary Examiner*—James J. Bell

[57] ABSTRACT

A dirt resistant silicone coating composition comprising:

(1) a base vinyl chainstopped polysiloxane,
(2) a resinous organopolysiloxane copolymer,
(3) a platinum catalyst and,
(4) a liquid organohydrogenpolysiloxane crosslinking agent.

42 Claims, No Drawings

TRANSPARENT MEMBRANE STRUCTURES

Matter enclosed in heavy brackets [ ] appears in the original patent but forms no part of this reissue specification; matter printed in italics indicates the additions made by reissue.

BACKGROUND OF THE INVENTION

The present invention relates to dirt repellent silicone coating compositions. More particularly, the present invention relates to dirt repellent silicone coating compositions for use on silicone coated membrane structures.

The discovery that Teflon ®-coated fiberglass could be utilized as a noncombustible, durable roof structure has initiated a transformation from simplistic temporary air supported structures to one with evergrowing potential. The impetus for the development of such fabric membrane structures was to provide roofing for large sports facilities. This led to other roofing uses such as for department stores, shopping malls, schools, exhibition buildings, industrial structures and the like. While the Teflon-coated fiberglass system has many desirable features such as durability and dirt resistance, it has a major deficiency in that light (solar) transmission is limited to approximately 10 to 15% due to the opaqueness of the Teflon.

One alternative to such Teflon-coated glass fabric is to utilize a layer of clear silicone rubber on the fabric. Not only does the silicone coating provide a substantially transparent coating, but also there is provided a coating which exhibits inertness to extreme temperatures (both heat and cold), ozone and ultraviolet light. However, silicone rubber suffers from the shortcoming that it is not dirt resistant, and in fact often picks up dirt upon exposure to the atmosphere. Accordingly, it is desirable to provide a transparent or translucent coating for silicone rubber which renders the silicone rubber resistant to dirt pickup.

One such dirt-resistant silicone rubber coating is provided in U.S. Pat. No. 3,639,155 to Hartlein et al. Therein Hartlein et al. disclose a silicone rubber which is resistant to dirt pickup comprising a base of silicone rubber having a cured coating on a surface of the silicone rubber exposed to the atmosphere, said coating being bonded to said silicone rubber and consisting essentially of, in the uncured state, a room temperature vulcanizable composition stable in the absence of moisture and curable upon exposure to moisture consisting essentially of an organopolysiloxane block copolymer consisting essentially of (A) 40 to 75 mol percent of diorganopolysiloxane units wherein the diorganosiloxane units are bonded through silicon-oxygen-silicon bonds forming a polydiorganosiloxane block having an average of from 15 to 350 diorganosiloxane units per block, said polydiorganosiloxane being at least 80 mol percent dimethylsiloxane units based on the total number of siloxane units in the polydiorganosiloxane and any remaining units being selected from the group consisting of phenylmethylsiloxane units and monomethylsiloxane units; (B) 15 to 50 mol percent organosiloxane units having an average formula:

$$R_xSiO_{\frac{4-x}{2}}$$

where x has a value of from 1 to 1.3 inclusive and R is an organic group selected from the group consisting of aryl radicals, vinyl radicals, methyl radicals, ethyl radicals, and propyl radicals, said organic groups being at least 50 percent aryl radicals based on the total number of organic groups in (B), said organosiloxane units comprise a block of at least three organosiloxane units and said organosiloxane units being selected from monoorganosiloxane units and diorganosiloxane units and (C) 3 to 25 mol percent of endblocking siloxane units of the formula:

$$R^1SiY_yO_{\frac{3-y}{2}}$$

where y has an average value from 1.8 to 2, $R^1$ is an organic radical selected from the group consisting of alkyl radicals having from 1 to 5 carbon atoms, phenyl radicals and vinyl radicals and Y is a monovalent radical selected from the group consisting of acetoxy radicals, alkoxy radicals having from 1 to 5 carbon atoms, and radicals of the formula —O—N=X where X is selected from the group consisting of radicals of the formula $R^2C=$ and

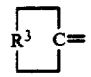

in which each $R^2$ is a radical selected from the group consisting of monovalent hydrocarbon radicals and halogenated monovalent hydrocarbon radicals and each $R^3$ is selected from the group consisting of divalent hydrocarbon radicals and halogenated divalent hydrocarbon radicals, the mol percentages of (A), (B) and (C) being based on the total number of siloxane units in the organosiloxane block copolymer.

More recently Shimizu et al. in U.S. Pat. No. 4,358,558, discloses a method for forming a dust or stainproof film comprising the steps of dissolving (1) 100 parts by weight of an aminoxy group-containing organosilicone compound having an average of more than two organoaminoxy groups per molecule, (2) 10 to 1000 parts by weight of a mixture of (A) 100 parts by weight of benzene-soluble polyorganosiloxane consisting substantially of $SiO_2$ units and $(R^1)_3SiO_{0.5}$ units in a ratio of one mole of $SiO_2$ to 0.4 to 1.0 mole of $(R^1)_3SiO_{0.5}$ units wherein $R^1$ is the same or different substituted or unsubstituted monovalent hydrocarbon group and wherein the ratio of reactive groups is 0.0004 to 1 reactive group per silicon atom, and (B) 10 to 1000 parts by weight of silanol-terminated polydiorganosiloxane having a viscosity of 30 to 2,000,000 cst. at 25° C. in (3) a mixed solvent consisting essentially of (A) a volatile organosilicon compound represented by the molecular formula $$(R^2)_4Si,\ (R^3)_3SiO[(R_4)_2SiO]_mSi(R^3)_3,\ R^5Si[OSi(R^6)_3]_3,\ \text{or}\ [(R^7)_2SiO]_n$$

wherein $R^2$ to $R^7$ are hydrogen or the same or different alkyl groups, m is 0 or a positive number, and n is 3 or a positive number greater than 3, and having a boiling point of 70° to 250° C. under normal pressure, and (B) a hydrocarbon solvent wherein the quantity of component (3)(A) is more than five weight percent of the total quantity of components (1), (3)(A) and (3)(B), such that the total quantity of components (1) and (2) are 5 to 80 weight percent of the total quantity of components (1), (2) and (3); and applying the resulting composition to the surface of a silicone elastomer, followed by drying.

Olsen, U.S. Pat. No. 4,297,265, discloses a silicone rubber coating composition having reduced surface tension comprising (a) a first component comprising silicone rubber and a solvent therefor, said silicone rubber comprising between 50% and 70% by weight of said first component, and (b) a second component comprising particulate $SiO_2$ having a particle size of less than 45 microns, said second component comprising 90% to 110% by weight of said component. As described by Olsen, the compositions of the invention is useful for coating flexible substrates which are then used directly or secured to rigid substrates. Glass fiber cloth is said to be a particularly suitable substrate which is then coated with 2–30 mils of silicone rubber to provide a structural member.

U.S. Pat. No. 4,300,532 to Olsen discloses a solar collector comprising a framework and a collector panel held in a planar position by said framework and comprising a glass cloth coated with a light absorbing room temperature vulcanizable silicone rubber.

Nelson, in U.S. Pat. No. 3,284,406, discloses a composition consisting essentially of (1) a polysiloxane of the formula, $$R_2ViSiO\left(\begin{array}{c}R^1\\|\\SiO\\|\\R^1\end{array}\right)_n SiR_2V_i$$

in which R and $R^1$ are phenyl or methyl and at least 80 mol percent of the $R^1$ groups are methyl, said siloxane having a viscosity of from 500 to 500,000 cs. at 25° C.; (2) from 5 to 50 percent by weight based on the weight of (1) and (2) of a copolymer of $SiO_2$, $Me_3SiO_{0.5}$ and $Me_2ViSiO_{0.5}$ siloxane units in which copolymer there is from 1.5 to 3.5 percent by weight vinyl groups based on the weight of (2) and in which copolymer the ratio of total $Me_3SiO_{0.5}$ and $Me_2ViSiO_{0.5}$ to $SiO_2$ units is from 0.6:1 to 1:1; (3) a compound compatible with (1) and (2) which is a siloxane containing from 0.1 to 1.7 percent by weight silicon-bonded hydrogen atoms, the remaining valences of the silicon atoms in (3) being satisfied by phenyl or methyl radicals, there being at least three silicon-bonded hydrogen atoms per molecule, and in (3) any hydrocarbon radicals attached to an SiH silicon being essentially all methyl radicals, the amount of (3) being such that there is from 0.75 mol of SiH per mol of vinyl radicals in (1) and (2) to 1.5 mol of SiH per mol of vinyl radicals in (1) and (2); and (4) a platinum catalyst.

Modic disclosed an organopolysiloxane composition having improved tear strength in U.S. Pat. No. 3,436,366 and which is assigned to the same assignee as the present invention. That composition contains four essential components: (1) a vinyl chainstopped polysiloxane having a viscosity of from about 50,000 to 750,000 cs. at 25° C.; (2) an organopolysiloxane copolymer comprising trimethylsiloxane units, methylvinylsiloxane units and $SiO_2$ units where from about 2.5 to 10 mole percent of the silicon atoms contain silicon-bonded vinyl groups and where the ratio of trimethylsiloxane units to $SiO_2$ units is between 0.5:1 and 1:1; (3) a platinum catalyst and (4) an organohydrogenpolysiloxane crosslinking fluid, and optionally, (5) a finely divided inorganic filler. The unique feature disclosed by Modic is the use of component (2) which contains $SiO_2$ units, trimethylsiloxane units and methylvinylsiloxane units.

SUMMARY OF THE INVENTION

It is a principal object of the present invention to provide a silicone coating composition which is resistant to dirt pickup.

It is another object of the present invention to provide a transparent or translucent dirt resistant silicone coating composition for use on membrane structures.

Still another object of the present invention is to provide a process for making silicone coating compositions which are resistant to dirt pickup.

In accordance with one embodiment of the present invention there is provided a dirt resistant silicone coating composition comprising:

(1) a liquid vinyl chainstopped polysiloxane having the formula $$CH_2{=}CH{-}\overset{\overset{R}{|}}{\underset{\underset{R}{|}}{SiO}}\left(\overset{\overset{R^1}{|}}{\underset{\underset{R^1}{|}}{SiO}}\right)_n\overset{\overset{R}{|}}{\underset{\underset{R}{|}}{Si}}{-}CH{=}CH_2$$

where R and $R^1$ are monovalent hydrocarbon radicals free of aliphatic unsaturation with at least 50 mole percent of the $R^1$ groups being methyl, and where n has a value sufficient to provide a viscosity up to 500 centipoise at 25° C.;

(2) a resinous organopolysiloxane copolymer comprising $(R^2)_3SiO_{0.5}$ units and $SiO_2$ units, where $R^2$ is selected from the group consisting of vinyl radicals and monovalent hydrocarbon radicals free of aliphatic unsaturation, where the ratio of $(R^2)_3SiO_{0.5}$ units to $SiO_2$ units is from about 0.5:1 to about 1:1, and where from about 1.5 to about 10 mole percent of the silicon atoms contain silicon-bonded vinyl groups;

(3) optionally, a finely divided inorganic filler;

(4) a platinum catalyst; and (5) a liquid organohydrogenpolysiloxane having the formula, $$(R)_a(H)_bSiO_{\frac{4-a-b}{2}}$$

sufficient to provide from about 0.5 to about 1.0 silicon-bonded hydrogen atoms per silicon-bonded vinyl group, where R is as previously defined, a has a value of from about 1.0 to about 2.1, b has a value of from about 0.1 to about 1.0, and the sum of a and b is from about 2.0 to about 2.7, there being at least two silicon-bonded hydrogen atoms per molecule.

In another embodiment of the present invention, the dirt resistant silicone coating composition comprises:

(1) a liquid vinyl chainstopped polysiloxane having the formula,

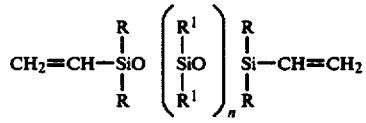

where R and $R^1$ are monovalent hydrocarbon radicals free of aliphatic unsaturation with at least 50 mole percent of the $R^1$ groups being methyl, and where n is sufficient to provide a viscosity up to 1,000 centipoise at 25° C.;

(2) a resinous organopolysiloxane copolymer comprising $(R^3)_3SiO_{0.5}$ units, $(R^3)_2SiO$ units and $SiO_2$ units, where $R^3$ is selected from the group consisting of vinyl radicals and monovalent hydrocarbon radicals free of aliphatic unsaturation, where from about 1.5 to about 10 mole percent of the silicon atoms contain silicon-bonded vinyl groups, and where the ratio of $(R^3)_3SiO_{0.5}$ units to $SiO_2$ units is from about 0.5:1 to about 1:1 and the ratio of $(R^3)_2SiO$ units to $SiO_2$ units may range up to 0.1:1, (3) optionally, a finely divided inorganic filler;

(4) a platinum catalyst; and (5) a liquid organohydrogenpolysiloxane having the formula, $$(R)_a(H)_bSiO_{\frac{4-a-b}{2}}$$

sufficient to provide from about 0.5 to about 1.0 silicon-bonded hydrogen atoms per silicon-bonded vinyl group, where R is as previously defined, a has a value of from about 1.0 to about 2.1, b has a value of from about 0.1 to about 1.0, and the sum of a and b is from about 2.0 to about 2.7, there being at least two silicon-bonded hydrogen atoms per molecule.

It is contemplated that the dust resistant silicone coating compositions of the present invention may be applied to the surface of a silicone base composition which has been deposited on a suitable substrate, for example, glass fabric. The resulting product is preferably used as a roofing structure, that is, as an air supported, tension supported or air inflated material for use as a covering for swimming pools, tennis courts, pavilions, shopping malls, sports stadiums and the like.

The dirt resistant compositions of the instant invention are prepared by mixing in a suitable fashion all of the components and maintaining the mixture at the temperature at which it is to be cured. The compositions cure at temperatures which may vary from room temperature to temperatures of 100° C. or higher, depending on the amount of platinum catalyst present in the composition and depending on the time allowed for curing. The compositions which are free of finely divided inorganic filler are transparent whereas the compositions containing such filler are translucent or opaque, depending on the particular filler employed. Additionally, the higher the ratio of resinous copolymer (i.e., component 2) to vinyl chainstopped polysiloxane (i.e., component 1) and the lower the viscosity of the polysiloxane, the more resinous or hard the top coating composition and hence the more dirt resistant the top coating composition.

DESCRIPTION OF THE INVENTION

In accordance with one embodiment of the present invention there is provided a dirt resistant silicone coating composition comprising:

(1) a liquid vinyl chainstopped polysiloxane having the formula,

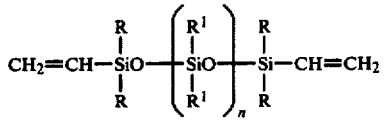

where R and $R^1$ are monovalent hydrocarbon radicals free of aliphatic unsaturation with at least 50 mole percent of the $R^1$ groups being methyl, and where n has a value sufficient to provide a viscosity up to 500 centipoise at 25° C.;

(2) a resinous organopolysiloxane copolymer comprising $(R^2)_3SiO_{0.5}$ units and $SiO_2$ units, where $R^2$ is selected from the group consisting of vinyl radicals and monovalent hydrocarbon radicals free of aliphatic unsaturation, where the ratio of $(R^2)_3SiO_{0.5}$ units to $SiO_2$ units is from about 0.5:1 to about 1:1, and where from about 1.5 to about 10 mole percent of the silicon atoms contain silicon-bonded vinyl groups;

(3) optionally, a finely divided inorganic filler;

(4) a platinum catalyst; and (5) a liquid organohydrogenpolysiloxane having the formula, $$(R)_a(H)_bSiO_{\frac{4-a-b}{2}}$$

sufficient to provide from about 0.5 to about 1.0 silicon-bonded hydrogen atoms per silicon-bonded vinyl group, where R is as previously defined, a has a value of from about 1.0 to about 2.1, b has a value of from about 0.1 to about 1.0, and the sum of a and b is from about 2.0 to about 2.7, there being at least two silicon-bonded hydrogen atoms per molecule.

In another embodiment of the present invention, the dirt resistant silicone coating composition comprises:

(1) a liquid vinyl chainstopped polysiloxane having the formula

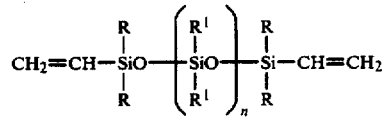

where R and $R^1$ are monovalent hydrocarbon radicals free of aliphatic unsaturation with at least 50 mole percent of the $R^1$ groups being methyl, and where n is sufficient to provide a viscosity up to 1,000 centipoise at 25° C.;

(2) a resinous organosiloxane copolymer comprising $(R^3)_3SiO_{0.5}$ units, $(R^3)_2SiO$ units and $SiO_2$ units, where $R^3$ is selected from the group consisting of vinyl radicals and monovalent hydrocarbon radicals free of aliphatic unsaturation, where from about 1.5 to about 10 mole percent of the silicon atoms contain silicon-bonded vinyl groups, and where the ratio of $(R^3)_3SiO_{0.5}$ units to $SiO_2$ units is from about 0.5:1 to about 1:1 and the ratio of $(R^3)_2SiO$ units to $SiO_2$ units may range up to 0.1:1;

(3) optionally, a finely divided inorganic filler;

(4) a platinum catalyst; and (5) a liquid organohydrogenpolysiloxane having the formula, $$(R)_a(H)_bSiO_{\frac{4-a-b}{2}}$$

sufficient to provide from about 0.5 to about 1.0 silicon-bonded hydrogen atoms per silicon-bonded vinyl group, where R is as previously defined, a has a value of from about 1.0 to about 2.1, b has a value of from about 0.1 to about 1.0, and the sum of a and b is from about 2.0 to about 2.7, there being at least two silicon-bonded hydrogen atoms per molecule.

All of the components of the dirt resistant silicone composition of the present invention are known in the art. The vinyl chainstopped organopolysiloxane component (1) is typified by various compositions within the scope of the formula where the monovalent hydrocarbon radicals represented by R and $R^1$ include alkyl radicals, e.g. methyl, ethyl, propyl, butyl, octyl, etc.; aryl radicals, e.g. phenyl, tolyl, xylyl, etc.; cycloalkyl radicals, e.g. cyclohexyl, cycloheptyl, etc.; and aralkyl radicals, e.g. benzyl, phenylethyl, etc. In a preferred embodiment, all of the radicals represented by R and $R^1$ are selected from the group consisting of methyl and phenyl radicals. In the most preferred embodiment, all of the radicals represented by R and $R^1$ are methyl.

It is essential that the vinyl chainstopped polysiloxane be of a relatively low viscosity. In general, the viscosity may range up to about 1,000 centipoise since at higher viscosities the final product will be too rubbery. Preferably, the viscosity of the polysiloxane ranges from about 100 centipoise to about 500 centipoise at 25° C. and most preferably has a viscosity of about 300 centipoise at 25° C. The organopolysiloxane copolymer which comprises component (2) is known in the art as an MQ resin. The $R^2$ groups of the $(R^2)_3SiO_{0.5}$ units (M units) can be vinyl or monovalent hydrocarbon radicals free of aliphatic unsaturation, with at least from about 1.5 to about 10 mole percent of the silicon atoms having vinyl groups bonded thereto. The $R^2$ groups which are not vinyl are of the same scope as the R and $R^1$ groups of the vinyl chainstopped polysiloxane and, like these groups, preferably are selected from the group consisting of methyl and phenyl, and most preferably all of the $R^2$ groups are methyl.

In addition to the $(R^2)_3SiO_{0.5}$ units, a limited number of $(R^2)_2SiO$ groups can be present in the resin so long as the dirt resistant property of the final product is not deleteriously affected. Of course, vinyl groups can be present in only the $(R^2)_2SiO$ units or in only the $(R^2)_3SiO_{0.5}$ units, however, it is preferred that both the monofunctional and difunctional units include vinyl groups.

In general, the various types of siloxane units in component (2) are selected so that the ratio of the $(R^2)_3SiO_{0.5}$ units to the $SiO_2$ units ranges from about 0.5:1 to about 1:1. The $(R^2)_2SiO$ units can be present in an amount of up to about 10 mole percent based on the total number of moles of siloxane units in the copolymer. Regardless of where the silicon-bonded vinyl groups are located in the resinous copolymer, the silicon-bonded binyl groups should be present in an amount ranging from about 1.5 to about 10 mole percent of copolymer component (2).

The copolymer component (2) is a solid resinous material and is most often available as a solution in a solvent such as xylene or toluene, generally as a 40 to 60 percent by weight solution. For ease of handling the compositions of the present invention, copolymer component (2) is usually dissolved in some or all of vinyl chainstopped polysiloxane component (1) and the solvent stripped from the resulting solution to produce a solution of copolymer (2) in polysiloxane (1). The proportion of the solution of component (2) is selected so as to give the desired amount of component (2) when the solution is combined with the other components of the composition of the invention.

Generally, the amount of resinous copolymer (2) ranges from about 0.75 to about 1.25 parts by weight based on the weight of component (1). The amount of resin employed is critical inasmuch as the ratio of polysiloxane (1) to resinous copolymer (2) determines how rubbery or how hard the final product will be. The higher the viscosity of the vinyl terminated polysiloxane and also the higher the ratio of polysiloxane to resinous copolymer, the more rubbery will be the dirt resistant top coating. The greater the amount of MQ resin in the final composition and the lower the viscosity of the polysiloxane, the more resinous or hard the top coat will be and hence more dirt resistant.

The foregoing should enable the artisan to formulate a suitable composition by altering the ratio of component (1) to component (2) and/or by altering the viscosity of component (1) without undue experimentation.

The finely divided inorganic filler component (3) is an optional component. When it is omitted the composition cures to a transparent material whereas when the filler is included the final product is translucent. The extent to which light transmission is reduced as a result of increased opaqueness is determined by the quantity of filler utilized, i.e. more filler reduces the amount of light which passes through the coating material. Since the function of the finely divided filler is not to reinforce the composition, reinforcing fillers are generally not employed. Of course, if a particular use requires reinforcement, reinforcing fillers may be used.

The main function of the finely divided filler is to reduce the amount of light transmission when the composition of the present invention is utilized on fabric membrane structures as discussed more fully hereinbelow. Briefly, if a transparent roofing material is desired, for example to cover a greenhouse, swimming pool or tennis court, no filler is included in the base silicone composition or the dirt resistant coating composition of the present invention thereby allowing the maximum amount of light to pass. In other situations, for example, department stores or shopping malls, it may be more desirable that a somewhat translucent covering be employed. Depending on the amount of light transmission desired, filler can be included only in the dirt resistant top coating (for a nearly transparent covering), only in the silicone base coating, or in both the silicone base coating and the silicone top coating.

When a filler is included in the composition of the present invention it should be noted that the hardness of the final product is increased. Thus, it should be recognized by the artisan that the ratio of vinyl chainstopped polysiloxane (1) to resinous copolymer (2) may be increased, the viscosity of polysiloxane (1) can be increased, or a combination of these steps may be taken in order to obtain a dirt resistant coating composition of a specific quality.

The finely divided inorganic fillers can be almost any type of finely divided inorganic material which accomplishes the above objects. Among the more common inorganic fillers are ground quartz, titanium dioxide, ferric oxide, chromic oxide, glass fibers, calcium carbonate, carbon black and talc. It is contemplated that such fillers may be present in amounts up to 200 parts by weight or more based on the weight of component (1).

The platinum catalyst component (4) employed in the present invention includes all of the well known platinum catalysts which are effective for catalyzing the reaction between silicon-bonded hydrogen groups and silicon-bonded vinyl groups. These materials include the various platinum catalysts, such as the chloroplatinic acid catalyst described in U.S. Pat. No. 2,823,218 to Speier, the platinum hydrocarbon complexes shown in U.S. Pat. Nos. 3,159,601 and 3,159,662 to Ashby, the platinum alcoholate catalysts described in U.S. Pat. No. 3,220,972 to Lamoreaux, as well as the platinum catalysts of U.S. Pat. No. 3,814,730 to Karstedt. Regardless of the type of platinum catalyst employed, the catalyst is used in an amount sufficient to provide from about $10^{-3}$ to $10^{-6}$ grm atoms of platinum per mole of silicon-bonded vinyl groups in the composition.

The organohydrogenpolysiloxane component (5) has the general formula $$(R)_a(H)_bSiO_{\frac{4-a-b}{2}}$$

and is employed in an amount sufficient to provide from about 0.5 to 1.0 silicon-bonded hydrogen atoms per silicon-bonded vinyl group, where R is as previously defined, a has a value of from about 1.0 to about 2.1, b has a value of from about 0.1 to about 1.0, and the sum of a+b is from about 2.0 to about 2.7, there being at least two silicon bonded hydrogen atoms per molecule. One of the silicon-bonded hydrogen atoms of the molecule reacts with a silicon-bonded vinyl group of one of the compositions of component (1) or component (2) and the second silicon-bonded hydrogen atom reacts with another of such silicon-bonded vinyl groups.

One illustration of a specific organohydrogenpolysiloxane which can be employed in the practice of the present invention is 1,3,5,7-tetramethylcyclotetrasiloxane, which contains one silicon-bonded methyl group and one silicon-bonded hydrogen atom per silicon atom. Another illustrative material is a dimethylhydrogen chainstopped dimethylpolysiloxane containing from two to three silicon atoms in the molecule. Another suitable composition is one which comprises a copolymer of dimethylsiloxane units, methylhydrogensiloxane, units and trimethylsiloxane units and which contain from 2 to 10 or more silicon atoms per molecule. A still further useful type of compound is the compound containing three dimethylhydrogensiloxane units and one monomethylsiloxane unit per molecule. Another useful material is the low viscosity fluid composed of dimethylhydrogensiloxane units and $SiO_2$ units in the ratio of two moles of the former to one mole of the latter. In addition to containing silicon-bonded methyl groups as illustrated in the specific compounds mentioned above, these organohydrogenpolysiloxanes can also contain a variety of other organic groups, even though the preferred materials are those in which all the groups are methyl. No disadvantage is found in substituting a minor portion of the methyl groups with phenyl groups. Other organohydrogenpolysiloxane crosslinking fluids are well known to those skilled in the art.

While the compositions of the present invention can be prepared by merely mixing the various components together in any desired fashion, it is usually most convenient to prepare these compositions in two separate portions or packages which are combined at the time the compositions are to be converted to the solid, cured final product. In the case of a two-package formulation, it is preferable that one package include the vinyl chainstopped polysiloxane component (1), the organopolysiloxane copolymer component (2) which has previously been dissolved in some or all of the vinyl chainstopped polysiloxane, the platinum catalyst component (4) and some or all of the finely divided filler where a finely divided filler component (3) is employed. The second package contains as its sole essential ingredient the organohydrogenpolysiloxane component (5), but as a matter of convenience, the second package can also contain a portion of the vinyl chainstopped polysiloxane component (1) and a portion of any finely divided filler component (3) which may be employed.

By adjusting the amount of vinyl chainstopped polysiloxane fluid and filler in the second package, the relative proportions of the two packages required to produce the compositions of the present invention is controlled. Generally, the distribution of the components between the two packages is such that from 0.1 to 1 part by weight of the second package is employed per part of the first package. In selecting the components of the two packages, it is best not to include both the platinum catalyst and the organohydrogenpolysiloxane in the same package.

When the two package system is employed, the two components are merely mixed in a suitable fashion at the point of use and the mixture is maintained at the curing temperature until curing has been completed. Generally, complete curing can be obtained in times varying from 24 hours at room temperature to 10 to 20 minutes at a temperature of about 100° C. The rate of cure is a function of both the concentration of platinum catalyst and curing temperatures.

In practicing the present invention, a suitable substrate can be rendered substantially dirt repellent by applying a layer of the composition of the present invention thereto in a thickness of up to about 50 mils. For most purposes, however, a coating of from about 0.1 mil to about 20 mils thickness will provide an excellent dirt resistant coating.

Included among the substrates which can be rendered dirt resistant are silicone rubber compositions, silicone sealants, certain plastic materials and the like. However, as disclosed more fully hereinbelow, the dirt resistant silicone coating composition of the present invention is particularly useful in combination with a base fabric material and a base coating composition for use as a roofing fabric membrane structure.

The base fabric material can be any suitable composition. It may be made from a natural fiber such as cotton, a synthetic fiber such as polyester, nylon or glass fabric, or mixtures of such fibers, depending on the properties which are desired for the base fabric. Cotton constructions are easily dyed, absorb moisture and withstand high temperatures without damage. Polyester produces fibers that are smooth, crisp and resilient, and since moisture does not penetrate polyester, it does not affect the size or shape of the fiber. Nylon is the strongest of the commonly used fibers and it is both elastic and resilient so that articles made with nylon will return to their original shape. Nylon fibers are smooth, very non-absorbent and will not soil easily. Glass fibers offer very low elongation and very high strength and hence are particularly useful for roofing fabric membrane structures.

The base fabric material construction can be of any suitable type such as woven, knitted or nonwoven. Woven fabrics have three basic constructions: the plain weave, the twill weave and the satin weave. The plain weave is by far the strongest because it has the tightest interlacing of fibers and, accordingly, is used most often. Woven nylon or heavy cotton are typically utilized for making tarpaulin substrates and the like.

Knitted fabrics are used where moderate strength and considerable elongation are required. Of course, when the polymeric base coating, discussed in greater detail hereinbelow, is put on such a knit fabric, the stretch properties are somewhat reduced.

Nonwoven textile fabrics are porous, textile-like materials composed primarily of fibers and are manufactured by processes other than spinning, weaving, knitting or knotting. A few basic elements can be varied and controlled to produce a great range of nonwoven fabric materials. These include the fibers, including chemical types and physical variations; the web and the average geometric arrangement of its fibers as predetermined by its method of forming and subsequent processing; the bonding of the fibers within the web and reinforcements. In practice, each element can be varied and, thus, can exert a powerful influence, alone and in combination, on the final fabric properties. For an excellent discussion of nonwoven textile fabrics the reader is referred to the Encyclopedia of Chemical Technology, Vol. 16, Kirk-Othmer (John Wiley and Sons, 1981), pages 72–124.

Included within the definition of base fabric material are suitable laminated and reinforced plastics. Reinforced plastics are combinations of fibers and polymeric binders or matrices that form composite materials. Preferably, good adhesion exists between the fibers and the binder rather than merely a mechanical fit without adhesion. For further information, the reader is referred to the Encyclopedia of Chemical Technology, Vol. 13, Kirk-Othmer (John Wiley and Sons, 1981), pages 968–977.

Experience thus far has been that fiberglass fabric is particularly preferred as the base fabric material for the roofing fabric membrane structure of the present invention.

It is contemplated that the base fabric material, that is, preferably fiberglass fabric, will be coated with a base coating composition. Such base coating composition can be any suitable material which preferably is transparent or translucent, waterproof and somewhat flexible. In the preferred embodiments of the present invention, the base coating material is a silicone composition.

One example of a suitable silicone base polymer is described in U.S. Pat. No. 3,457,214 to Modic, assigned to the same assignee as the present invention and incorporated herein by reference. This patent teaches the artisan how to provide transparent silicone compositions having silica filler by employing phenyl containing polymers to adjust the refractive index of the composition. This approach, however, is not preferred since the refractive index of the polymer will change with temperature and thus the transparency of the filled silicone will also change.

Accordingly, it is particularly preferred that resin reinforced, addition cure type silicone compositions be utilized as the base coating as such compositions' transparency is not affected by temperature changes. Examples of particularly preferred silicone base coating compositions are described in U.S. Pat. Nos. 3,284,406 and 3,436,366, both of which are incorporated by reference into the instant disclosure. Each of these references is described in greater detail hereinabove.

It should be noted that each of these patents provides for the optional inclusion of a finely divided inorganic filler. In practicing the present invention, such filler is primarily useful as a means for controlling the transparency of the base polymer. When no filler is present the base polymer is transparent. As filler is added to the composition it becomes less transparent. The skilled artisan, after referring to the above references, will be able to formulate a suitable silicone base coating composition without undue experimentation.

Regardless of which materials are selected as the base fabric composition and the base coating composition, it is essential that the dirt resistant coating composition of the present invention be applied to at least one surface, and preferably all surfaces, that are exposed to the atmosphere.

Although the dirt resistant silicone coating composition can be applied to the base coating composition by any suitable means, the low viscosity of the composition makes spraying particularly preferred. As with any substrate coated with the dirt resistant coating composition of the present invention, the roofing membrane structure is also coated with a layer up to about 50 mils thickness. It is anticipated, however, that a coating ranging from 0.1 to 20 mils in thickness will adequately protect the roofing membrane structures from dirt or dust build up which adversely affects the membranes transparency.

In order that those skilled in the art might be better able to practice the present invention, the following examples are given by way of illustration and not by way of limitation.

EXAMPLES

EXAMPLE 1

The base coating composition was formulated as follows: 75 parts of an 80,000 cps. vinyldimethyl-terminated polydimethylsiloxane polymer and 25 parts of a resinous polymer, which was added as a 60% solids solution of a copolymer of trimethylsiloxane units, $SiO_2$ units and methylvinylsiloxane units were mixed together. The solvent was removed to provide a composition having a viscosity of 70,000 cps. To this was added 10 ppm of platinum in the form of a platinum complex with methyl vinyl tetramer.

To 100 parts of the above resin-containing composition was added 10 parts of a crosslinking agent consisting of 5 parts of the vinyldimethyl-terminated polysiloxane described above and 5 parts of a 50% methylhydrogensiloxane and 50% dimethylsiloxane copolymer. This base coating composition was knife-coated at 100% solids onto a DE-45 2/2 24×19 plain weave glass cloth fabric and cured for 4 minutes at 400° F., giving 21.8 oz./square yard coated weight, with the following results: Strip tensile=530/460 psi; Trapezoid tear=46.5/50.8 psi; Solar transmittance=48%.

This coated fabric was not dirt resistant and therefore was not suitable for use in an outdoor environment without the application of a dirt resistant coating.

lency for each composition. The dirt repellency was measured by a laboratory test intended to simulate the dirt retention of the coated fabric on outdoor exposure. A synthetic soil was applied to the coated fabric and then washed off with a water spray. The dirt repellency was then examined visually.

TABLE I

| Example No | Component (1) Si vinyl viscosity (cps) | Component (2) copolymer parts | Component (4) hyrdide parts | Viscosity of composition cps (1) + (2) | Hardness Shore A | Hardness Shore D | Relative Dirt Repellancy |
|---|---|---|---|---|---|---|---|
| 2a | 3200 cps | 33.3 | 13.3 | 4500 | 45 | — | Poor |
| 3a | 3200 | 66.6 | 16.6 | 12000 | 70 | 18 | Fair |
| 3b | 3200 | 66.6 | 20.0 | 12000 | 77 | 20 | Fair |
| 4a | 300 | 66.6 | 16.6 | 3500 | 73 | 13 | Fair |
| 4b | 300 | 66.6 | 20.0 | 3500 | 76 | 14 | Fair |
| 4c | 300 | 66.6 | 23.3 | 3500 | 78 | 15 | Fair |
| 5a | 300 | 100.0 | 20.0 | 120000 | 80 | 21 | Excellent |
| 5b | 300 | 100.0 | 22.0 | 120000 | 85 | 24 | Excellent |
| 5c | 300 | 100.0 | 24.0 | 120000 | 88 | 25 | Excellent |
| 6a | 20 | 100.0 | 28.0 | 22000 | 84 | 25 | Excellent |
| 6b | 20 | 100.0 | 30.0 | 22000 | 88 | 29 | Excellent |
| 6c | 20 | 100.0 | 33.0 | 22000 | 90 | 30 | Excellent |
| 7a | 20 | 120.0 | 30.8 | 42500 | 91 | 43 | Excellent |
| 7b | 20 | 120.0 | 35.2 | 42500 | 96 | 45 | Excellent |

EXAMPLES 2 through 7

Examples 2 through 7, which follow, describe different compositions containing dimethylvinyl chainstopped organopolysiloxanes having different viscosities and varying proportions of the other components of the reaction mixture. In each case, all of the components of the reaction mixture were thoroughly mixed and then heated to a temperature of 100° C. for 30 minutes to cure the composition. In those cases in which no finely divided inorganic filler or other coloring agent was employed, the compositions were cured, transparent silicone rubber. The vinyl chainstopped diorganopolysiloxane employed in each example was a dimethylvinyl chainstopped dimethylpolysiloxane and the variable in the composition was the viscosity. In each case 100 parts of the vinyl chainstopped polysiloxane component (1) was employed.

The copolymer component (2) was employed as a 60% xylene solution of a copolymer of trimethylsiloxane units, $SiO_2$ units and methylvinylsiloxane units. The various units were present in an amount sufficient to provide 0.8 trimethylsiloxane units per $SiO_2$ unit and with the methylvinylsiloxane units being present in an amount such that 7.0 mole percent of the silicon atoms were present as methylvinylsiloxane units and the remaining silicon atoms were present as a part of a trimethylsiloxane unit or an $SiO_2$ unit. Component (1) and the solution of component (2) were premixed in the proportions required by the examples and the mixture was heated at 110° C. and 25 mm Hg for 4 hours to remove the xylene and form a solution of component (2) in component (1). Component (3), the platinum catalyst, was one part chloroplatinic acid dissolved in one part n-butyl alcohol and was present in an amount sufficient to provide $10^{-5}$ gram atoms platinum per mole of silicon-bonded vinyl groups in the composition. The organohydropolysiloxane, component (4), was a 10 cps. liquid copolymer of dimethylhydrogensiloxane units and $SiO_2$ units containing an average of two dimethylhydrogensiloxane units per $SiO_2$ unit.

In Table I which follows is listed the viscosity of the vinyl-chainstopped dimethylpolysiloxane component (1), the parts of the copolymer component (2), the parts of the organohydrogensiloxane component (4), Shore A hardness, Shore D hardness, and relative dirt reppel-

I claim:

1. A roofing fabric membrane structure composition comprising:

(a) a base fabric material, (b) a base coating composition, applied to at least one surface of said base fabric material and (c) a silicone coating composition applied to at least one surface of said base fabric material already having thereon said base coating composition which is resistant to dirt pickup comprising:

(i) a liquid vinyl chainstopped polysiloxane having the formula,

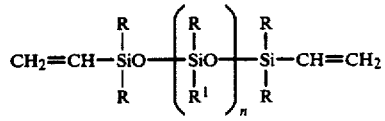

where R and $R^1$ are monovalent hydrocarbon radicals free of aliphatic unsaturation with at least 50 mole percent of the $R^1$ groups being methyl, and where n has a value sufficient to provide a viscosity up to about 1,000 centipoise at 25° C.;

(ii) a resinous organopolysiloxane copolymer comprising:

(i) $(R^2)_3SiO_{0.5}$ units and $SiO_2$ units, (ii) $(R^3)_3SiO_{0.5}$ units, $(R^3)_2SiO$ units and $SiO_2$ units, or (iii) mixtures thereof, where $R^2$ and $R^3$ are selected from the group consisting of vinyl radicals and monovalent hydrocarbon radicals free of aliphatic unsaturation, where from about 1.5 to about 10 mole percent of the silicon atoms contain silicon-bonded vinyl groups, where the ratio of monofunctional units to tetrafunctional units is from about 0.5:1 to about 1:1, and the [ratios of] difunctional units [to tetrafunctional units ranges up to about 0.1:1;] *can be present in an amount of up to about 10 mole percent based on the total number of moles of siloxane units in the copolymer;*

(iii) a platinum or platinum containing catalyst; and (iv) a liquid organohydrogenpolysiloxane having the formula, $$(R)_a(H)_bSiO_{\frac{4-a-b}{2}}$$

sufficient to provide from about 0.5 to about 1.0 silicon-bonded hydrogen atoms per silicon-bonded vinyl group, R is a monovalent hydrocarbon radical free of aliphatic unsaturation, a has a value of from about 1.0 to about 2.1, b has a value of from about 0.1 to about 1.0, and the sum of a and b is from about 2.0 to about 2.7, there being at least two silicon-bonded hydrogen atoms per molecule.

2. The composition of claim 1, wherein the base fabric material is made of a material selected from the group consisting of cotton, polyester, nylon and glass fabric.

3. The composition of claim 1, wherein the base fabric material is glass fabric.

4. The composition of claim 1, wherein the base fabric material is a woven fabric.

5. The composition of claim 1, wherein the base fabric material is a knitted fabric.

6. The composition of claim 1, wherein the base fabric material is a nonwoven material.

7. The composition of claim 1, wherein the base fabric material is selected from the group consisting of laminated and reinforced plastics.

8. The composition of claim 1, wherein the base fabric is fiberglass fabric.

9. The composition of claim 1, wherein the base coating composition is transparent or translucent.

10. The composition of claim 1, wherein the base coating composition is a silicone composition.

11. The composition of claim 1, wherein the silicone coating composition which is resistant to dirt pickup further comprises a finely divided inorganic filler.

12. The composition of claim 1, wherein all of the radicals represented by R and $R^1$ in the vinyl chainstopped polysiloxane of component (c) are selected from the group consisting of methyl and phenyl radicals.

13. The composition of claim 1, wherein all of the radicals represented by R and $R^1$ in component (c) in the vinyl chainstopped polysiloxane are methyl radicals.

14. The composition of claim 1, wherein the viscosity of the vinyl chainstopped polysiloxane of component (c) ranges from about 100 to about 500 centipoise at 25° C.

15. The composition of claim 1, wherein all of the radicals represented by $R^2$ and $R^3$ in the resinous organopolysiloxane copolymer of component (c) which are not vinyl radicals are selected from the group consisting of methyl and phenyl radicals.

16. The composition of claim 1, wherein all of the radicals represented by $R_2$ and $R^3$ in the resinous organopolysiloxane copolymer of component (c) which are not vinyl radicals are methyl radicals.

17. The composition of claim 1, wherein there is present in component (c) from about 0.75 to about 1.25 parts by weight resinous organopolysiloxane copolymer per 100 parts by weight vinyl chainstopped polysiloxane.

18. The composition of claim 11, wherein the finely divided inorganic filler is selected from the group consisting of ground quartz, titanium dioxide, ferric oxide, chromic oxide, glass fibers, calcium carbonate, carbon black and talc.

19. The composition of claim 1, wherein the catalyst of component (c) is present in an amount sufficient to provide from about $10^{-3}$ to about $10^{-6}$ gram atoms of platinum per mole of silicon-bonded vinyl groups in the composition.

20. The composition of claim 45, wherein the organohydrogenpolysiloxane of component (c) is selected from the group consisting of 1,3,5,7-tetramethylcyclotetrasiloxane, dimethylhydrogen chainstopped dimethylpolysiloxanes, polysiloxanes of 2 to 10 silicon atoms having dimethylsiloxane units, methylhydrogensiloxane units and trimethylsiloxane units, and low viscosity fluids composed of dimethylhydrogensiloxane units and $SiO_2$ units in a ratio of about 2:1.

21. The composition of claim 1, wherein the silicone coating composition which is resistant to dirt pickup is up to about 50 mils in thickness.

22. The composition of claim 1, wherein the silicone coating composition which is resistant to dirt pickup is from about 0.1 to about 20 mils in thickness.

23. A method for making a roofing fabric membrane structure comprising the steps:

I. applying to at least one side of a base fabric material, a base coating composition, II. applying to at least one side of said base fabric material coated with said base coating composition, a silicone coating composition which is resistant to dirt pickup comprising:

(a) a liquid vinyl chainstopped polysiloxane having the formula,

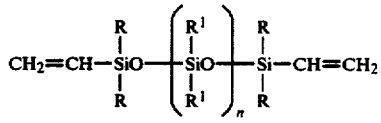

wherein R and $R^1$ are monovalent hydrocarbon radicals free of aliphatic unsaturation with at least 50 mole percent of the $R^1$ groups being methyl, and where n has a value sufficient to provide a viscosity up to about 1,000 centipoise at 25° C.;

(b) a resinous organopolysiloxane copolymer comprising:

(i) $(R^2)_3SiO_{0.5}$ units and $SiO_2$ units, (ii) $(R^3)_3SiO_{0.5}$ units, $(R^3)_2SiO$ units and $SiO_2$ units, or (iii) mixtures thereof, where $R^2$ and $R^3$ are selected from the group consisting of vinyl radicals and monovalent hydrocarbon radicals free of aliphatic unsaturation, where from about 1.5 to about 10 mole percent of the silicon atoms contain silicon-bonded vinyl groups, where the ratio of monofunctional units to tetra-functional units is from about 0.5:1 to about 1:1, and the [ratio of] difunctional units [to tetrafunctional units ranges up to about 0.1:1;] *can be present in an amount of up to about 10 mole percent based on the total number of moles of siloxane units in the copolymer;*

(c) a platinum or platinum containing catalyst; and (d) a liquid organohydrogenpolysiloxane having the formula, $$(R)_a(H)_bSiO_{\frac{4-a-b}{2}}$$

sufficient to provide from about 0.5 to about 1.0 silicon-bonded hydrogen atoms per silicon-bonded vinyl group, R is a monovalent hydrocarbon radical free of aliphatic unsaturation, a has a value of from about 1.0 to about 2.1, b has a value of from about 0.1 to about 1.0, and the sum of a and b is from about 2.0 to about 2.7, there being at least two silicon-bonded hydrogen atoms per molecule.

III. Curing said silicone coating composition which is resistant to dirt pickup to said base coating composition.

24. The method of claim 23, wherein the base fabric material is made of a material selected from the group consisting of cotton, polyester, nylon and glass fabric.

25. The method of claim 23, wherein the base fabric material is glass fabric.

26. The method of claim 23, wherein the base fabric material is a woven fabric.

27. The method of claim 23, wherein the base fabric material is a knitted fabric.

28. The method of claim 23, wherein the base fabric material is a nonwoven material.

29. The method of claim 23, wherein the base fabric material is selected from the group consisting of laminated and reinforced plastics.

30. The method of claim 23, wherein the base fabric material is fiberglass fabric.

31. The method of claim 23, wherein the base coating composition is transparent or translucent.

32. The method of claim 23, wherein the base coating composition is a silicone composition.

33. The method of claim 23, wherein the silicone coating composition which is resistant to dirt pickup further comprises a finely divided inorganic filler.

34. The method of claim 23, wherein all of the radicals represented by R and $R^1$ in the vinyl chainstopped polysiloxane are selected from the group consisting of methyl and phenyl radicals.

35. The method of claim 23, wherein all of the radicals represented by R and $R^1$ in the vinyl chainstopped polysiloxane are methyl radicals.

36. The method of claim 23, wherein the viscosity of the vinyl chainstopped polysiloxane ranges from about 300 to about 500 centipoise at 25° C.

37. The method of claim 23, wherein all of the radicals represented by $R^2$ and $R^3$ in the resinous organopolysiloxane copolymer which are not vinyl radicals are selected from the group consisting of methyl and phenyl radicals.

38. The method of claim 23, wherein all of the radicals represented by $R^2$ and $R^3$ in the resinous organopolysiloxane copolymer which are not vinyl radicals are methyl radicals.

39. The method of claim 23, wherein there is present from about 0.75 to about 1.25 parts by weight resinous organopolysiloxane copolymer per 100 parts by weight vinyl chainstopped polysiloxane.

40. The method of claim 33, wherein the finely divided inorganic filler is selected from the group consisting of ground quartz, titanium dioxide, ferric oxide, chromic oxide, glass fibers, calcium carbonate, carbon black and talc.

41. The method of claim 23, wherein the catalyst is present in an amount sufficient to provide from about $10^{-3}$ to about $10^{-6}$ gram atoms of platinum per mole of silicon-bonded vinyl groups in the composition.

42. The method of claim 23, wherein the organohydrogenpolysiloxane is selected from the group consisting of 1,3,5,7-tetramethylcyclotetrasiloxane, dimethylhydrogen chainstopped dimethylpolysiloxanes, polysiloxanes of 2 to 10 silicon atoms having dimethylsiloxane units, methylhydrogensiloxane units and trimethylsiloxane units, and low viscosity fluids composed of dimethylhydrogensiloxane units and $SiO_2$ units in a ratio of about 2:1.

* * * * *